Dec. 13, 1966  H. S. BOTTOMS  3,291,060
GEAR PUMPS

Filed March 21, 1966  2 Sheets-Sheet 1

Dec. 13, 1966  H. S. BOTTOMS  3,291,060
GEAR PUMPS

Filed March 21, 1966  2 Sheets-Sheet 2

United States Patent Office 3,291,060
Patented Dec. 13, 1966

3,291,060
GEAR PUMPS
Harry Simister Bottoms, Solihull, England, assignor to Joseph Lucas (Industries) Limited, Birmingham, England, a British company
Filed Mar. 21, 1966, Ser. No. 535,958
5 Claims. (Cl. 103—126)

This invention relates to gear pumps of the kind set forth in our U.S. application No. 390,029. In this application there is a pump of the kind comprising a housing, a pair of meshing toothed wheels mounted for rotation in the housing, an inlet port in the housing at one side of the point of interengagement of the teeth of the pair of wheels, and an outlet port in the housing at the other side of said point, characterised in that the inlet port is formed in a wall of the housing presented to the sides of the wheels, and has a cross-sectional shape which provides a main portion adjacent the sides of those teeth moving out of engagement with one another, and a pair of arcuate branches extending from the main portion beside the teeth of the two wheels respectively, each branch having an outer edge which tapers towards the root circle of the adjacent wheel.

The object of this invention is to provide a gear pump of the kind set forth in a convenient form in which entry of liquid to the pump for substantially completely filling the spaces between the teeth is facilitated.

The invention will now be described by way of example with reference to the accompanying drawings in which.

Figure 1:
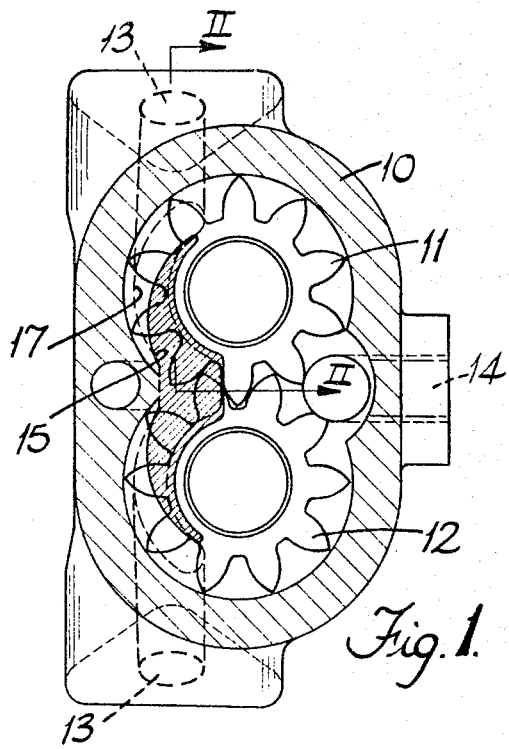
FIGURE 1 is a cross-sectional view of a pump incorporating the invention.
Figure 4:
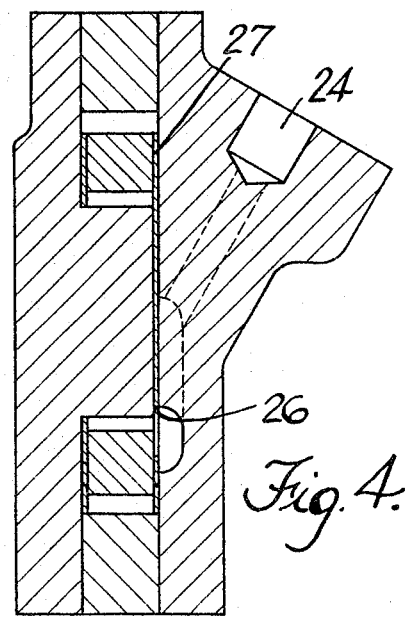
FIGURE 4 is a fragmentary cross-sectional view on the line IV—IV in FIGURE 3.
Figure 5:
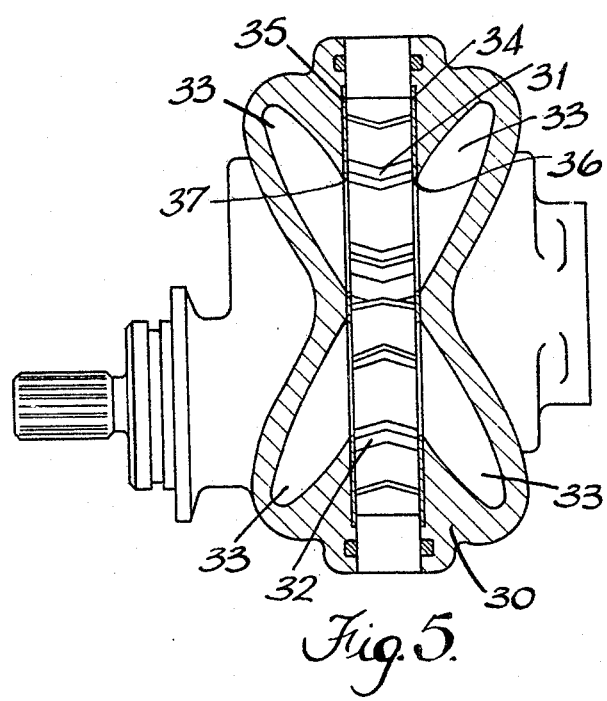
FIGURE 5 is a cross-sectional view of a further alternative form of pump.
Figure 2:
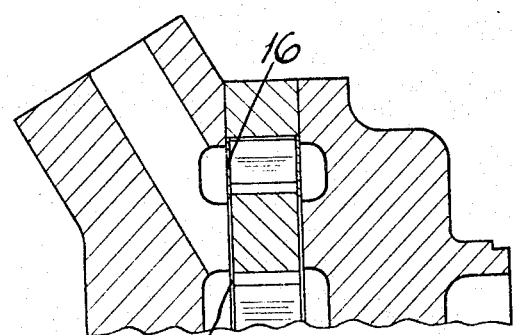
FIGURE 2 is a fragmentary cross-sectional view on the line II—II in FIGURE 1.

In the first example of the invention shown in FIGURES 1 and 2, there is provided a pump having a housing 10 defining a generally eight shaped cavity containing a pair of meshing toothed wheels 11, 12. The housing 10 has two inlet passages 13 at opposite sides respectively of the point of interengagement of the teeth of the wheels 11, 12 and there is also an outlet passage 14 at the other side of the point of interengagement. The inlet passages 13 communicate with an inlet port 15 the shape of which is indicated by shading in FIGURE 1 and which defines a main portion adjacent the sides of those teeth moving out of engagement with one another, and a pair of arcuate branches extending from the main portion beside the teeth of the two wheels respectively, each branch having an outer edge which tapers towards the root circle of the adjacent wheel. This arrangement is described in the specification No. 390,029.

However, the inlet ports 15 in the housing 10 are modified in that each of the inlet passages 13 is inclined to the axes of the wheels 11, 12 and the inclination, which is illustrated in FIGURE 2, is such that liquid to be pumped, which, in use, is normally supplied under pressure, from a boost pump (not shown), enters the space between the wheels, at which the inlet port 15 is situated, with a component of movement which is in contra-direction to the direction of movement of the adjacent teeth on the periphery of the adjacent wheel 11 or 12.

The inlet passages 13 are of circular cross-section over the greater portions of their lengths but adjacent to the wheels there is provided a plate 16 in which the inlet port 15 is cut, the shape of the adjacent portions of the passages 13 which join in this region being approximately similar, though larger than the inlet port 15 itself, this being shown by the dotted line 17 in FIGURE 1.

With this form of pump, it is of course necessary to provide two inlet passages 13 and these are aranged to extend inwardly towards the respective wheels, at an oblique angle to one another.

Figure 3:
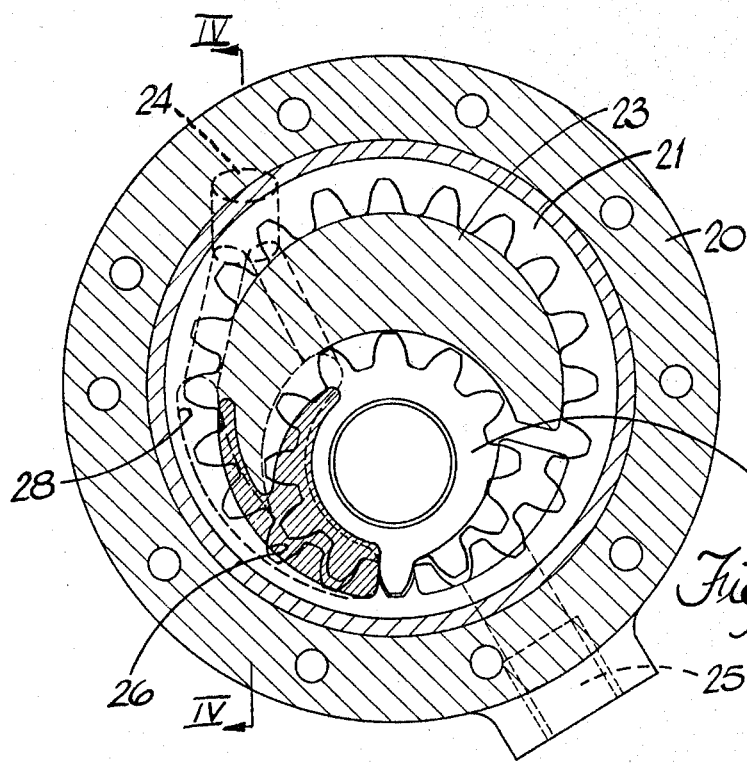
FIGURE 3 is a cross-sectional view of an alternative form of pump.

In the example shown in FIGURE 3 a housing 20 contains a pair of meshing toothed wheels 21, 22 which are in the form of an internally toothed annulus and an externally toothed wheel respectively. These are in mesh at one point on their peripheries, their axes of rotation being off-set. There is a crescent shaped part 23 between the gears 21, 22 and there is a single split inlet passage 24 and an outlet passage 25. An inlet port 26 has a main portion and a pair of branches and this arrangement is also fully described in the specification of the application previously mentioned.

The single inlet passage 24 is divided into a pair of passages which are both inclined to the axes of rotation of the wheels. As in the case of the first described example, there is a plate 27 in which the inlet port 26 is formed and the adjacent portions of the inlet passages are approximately similar though larger than the inlet port 26, as indicated by the dotted line 28.

There are pairs of inlet passages 33 on both sides of the wheels 31, 32, respective plates 34, 35 at opposite sides respectively, these plates having respective inlet ports 36, 37. The teeth on the wheels are of "herring bone" form, the leading edges of the teeth being adjacent to the respective sides of the wheels. Where there are inlets at one side of the wheels 31, 32 only (not illustrated), the leading edges of the teeth with respect to the direction of rotation, are at the side of the appropriate wheel adjacent to the inlet port.

Having thus described my invention what I claim as new and desire to secure by Letters Patent is:

1. A gear pump comprising a housing, a pair of meshing toothed wheels mounted for rotation in the housing, an inlet port in the housing at one side of the point of interengagement of the teeth of the pair of wheels, and an outlet port in the housing at the other side of said point, the inlet port being in a wall of the housing presented to the sides of the wheels, and having a cross-sectional shape which provides a main portion adjacent the sides of those teeth moving out of interengagement, and a pair of arcuate branches extending from the main portion beside the teeth of the two wheels respectively, each branch having an outer edge which tapers towards the root circle of the adjacent wheel, and there being an inlet passage in the body communicating with the inlet port, said inlet passage, at least in the region of the inlet port, extending in a direction which is inclined to the axes of rotation of the wheels, said inclination being such that lquid delivered through said inlet port has a component of movement in contra-direction to the direction of movement of that portion of the periphery of a wheel adjacent to the inlet port.

2. A gear pump as claimed in claim 1 in which the meshing wheels are housed in a generally eight shaped housing, there being two inlet passages communicating with the inlet port and extending from opposite sides respectively.

3. A gear pump as claimed in claim 1 in which one of the meshing wheels is an annulus and surrounds the other of the wheels, there being a single split inlet passage communicating with the branches of the inlet port respectively.

4. A gear pump as claimed in claim 1 in which there are inlet ports at opposite sides of the wheels respectively, and inlet passages communicating with the inlet ports respectively.

5. A gear pump comprising a housing, a pair of meshing toothed wheels mounted for rotation in the housing, an inlet port in the housing at one side of the point of interengagement of the teeth of the pair of wheels, and an outlet port in the housing at the other side of said point, the inlet port being in a wall of the housing presented to the sides of the wheels, and having a cross-sectional shape which provides a main portion adjacent the sides of those teeth moving out of interengagement, and a pair of arcuate branches extending from the main portion beside the teeth of the two wheels respectively, each branch having an outer edge which tapers towards the root circle of the adjacent wheel, and there being an inlet passage in the body communicating with the inlet port, said inlet passage, at least in the region of the inlet port, extending in a direction which is inclined to the axes of rotation of the wheels, said inclination being such that liquid delivered through said inlet port has a component of movement in contra-direction to the direction of movement of that portion of the periphery of a wheel adjacent to the inlet port, the teeth of the wheels being inclined with leading edges thereof, with respect to the direction of rotation, nearer to the adjacent inlet port.

References Cited by the Examiner

UNITED STATES PATENTS

| | | | |
|---|---|---|---|
| 2,400,485 | 5/1946 | Cardillo | 103—126 |
| 2,424,750 | 7/1947 | Heckert | 103—126 |
| 2,433,360 | 12/1947 | Haight | 103—126 |
| 2,440,986 | 5/1948 | Teeter | 103—126 |
| 2,966,118 | 12/1960 | McAlvay | 103—126 |
| 2,986,097 | 5/1961 | Chrzanowski et al. | 103—126 |
| 3,007,418 | 11/1961 | Brundage | 103—126 |
| 3,075,470 | 1/1963 | Wood | 103—126 |
| 3,106,897 | 10/1963 | Johnson | 103—126 |
| 3,204,564 | 9/1965 | Eltze | 103—126 |

MARK NEWMAN, *Primary Examiner.*

W. J. GOODLIN, *Assistant Examiner.*